United States Patent [19]
Mukai et al.

[11] Patent Number: 5,679,946
[45] Date of Patent: Oct. 21, 1997

[54] PHOTO-TAKING LENS TEMPERATURE COMPENSATION SYSTEM

[75] Inventors: Hiromu Mukai, Kawachinagano; Yasumasa Sugihara, Hashimoto; Rieko Hasegawa, Sakai, all of Japan

[73] Assignee: Minolta Co., Ltd., Osaka, Japan

[21] Appl. No.: 667,488

[22] Filed: Jun. 24, 1996

Related U.S. Application Data

[63] Continuation of Ser. No. 319,128, Oct. 6, 1994, abandoned.

[30] Foreign Application Priority Data

Oct. 14, 1993 [JP] Japan .................. 5-256635

[51] Int. Cl.$^6$ .................................................. G01J 1/20
[52] U.S. Cl. .......................... 250/201.2; 250/231.1; 396/97
[58] Field of Search .................. 250/201.2, 201.3, 250/201.4, 201.8, 214 C, 214 LS, 238, 231.1; 354/400–410; 355/53, 55, 30; 396/97

[56] References Cited

U.S. PATENT DOCUMENTS

| | | | |
|---|---|---|---|
| 4,650,309 | 3/1987 | Ishida et al. | 250/204 |
| 4,982,216 | 1/1991 | Kudo et al. | 354/400 |
| 5,124,738 | 6/1992 | Yamashita | 354/402 |
| 5,137,349 | 8/1992 | Taniguchi et al. | 355/55 |
| 5,162,836 | 11/1992 | Ishimaru | 354/410 |

FOREIGN PATENT DOCUMENTS

| | | |
|---|---|---|
| 59-160107 | 9/1984 | Japan . |
| 3-181924 | 8/1991 | Japan . |
| 4-43310 | 2/1992 | Japan . |
| 4-73627 | 3/1992 | Japan . |
| 4-320206 | 11/1992 | Japan . |

*Primary Examiner*—Que Le
*Attorney, Agent, or Firm*—Sidley & Austin

[57] ABSTRACT

A system that is mounted in a camera capable of focal point detection and that performs correction of the focal point detection data in accordance with the temperature, wherein the temperature inside the photo-taking lens barrel is measured and the focal point detection data is corrected based on the temperature data for the interior of the photo-taking lens barrel. Using this construction, because the temperature of a lens element comprising the photo-taking lens can be accurately measured even where the ambient temperature of the camera has suddenly changed, for example, appropriate correction suitable for the temperature conditions may be performed. Also disclosed is a construction in which the correction of the focal point detection data is performed based on not only the temperature data but also the focal length data for the photo-taking lens. Using this construction, appropriate correction suitable for the temperature conditions may be performed even when, for example, the focal length of the photo-taking lens has changed.

21 Claims, 10 Drawing Sheets

FIG.10

```
┌─────────────────────────────────┐
│ MEASURING                       │
│ TEMPERATURE------T              │   #10
└─────────────────────────────────┘
              ⇩
┌─────────────────────────────────┐
│           CALCULATING SUBJECT   │
│ A F--------DISTANCE   D         │   #20
│        D = D' + α(T)            │
└─────────────────────────────────┘
              ⇩
┌─────────────────────────────────┐
│ CALCULATING CORRECTING          │
│ VALUE   ΔL                      │   #30
│         ΔL = ΔL(T, f, D)        │
└─────────────────────────────────┘
              ⇩
┌─────────────────────────────────┐
│ CALCULATING DRIVING             │
│ AMOUNT L                        │   #40
│         L = L(20) + ΔL          │
└─────────────────────────────────┘
```

PHOTO-TAKING LENS TEMPERATURE COMPENSATION SYSTEM

This application is a continuation, of application Ser. No. 08/319,128, filed Oct. 6, 1994, abandoned.

BACKGROUND OF THE INVENTION

1. Field of the Invention

The present invention relates to a temperature compensation system, and more particularly to a temperature compensation system used for a photo-taking lens made principally of plastic.

2. Description of the Prior Art

The position of the image point of a photo-taking lens made mainly of plastic fluctuates considerably with changes in temperature. Consequently, it is necessary to perform a correction in response to the changed temperature such that the image point becomes located at a prescribed position. Since the fluctuation in the position of the image point caused by the change in temperature is manifested as a fluctuation of the lens back, a means to measure the temperature as well as a means to correct the lens position is needed in order to compensate for the fluctuation of the lens back. As a system equipped with these means, a temperature compensation system in which corrections are made to the camera's control data using a temperature measuring device located inside an IC (integrated circuit) has been proposed in Japanese Laid-Open Patent Hei 4-43310.

Further, where the photo-taking lens made mainly of plastic is a zoom lens, the degree of fluctuation of the lens back due to a change in temperature varies from one focal length to another, as a result of which it is particularly important how the correction Is performed in response to the change in temperature. As a temperature compensation system used for a zoom lens, constructions in which the compensation for the fluctuation of the lens back is performed by means of correction of the lens drive mount, as proposed in Japanese Laid-Open Patent Sho 59-160107, and in which the compensation for the fluctuation of the lens back takes place during the focusing process based on the degree of change in temperature from the preset in-focus status, as proposed in Japanese Laid-Open Patent Hei 3-181924, have been proposed. In addition, a construction in which the distance measurement data is corrected based on the temperature measurement data has also been proposed in Japanese Laid-Open Patent Hei 4-320206.

Further, although not applicable to a zoom lens construction, a construction in which the degree of change in magnification is calculated from the degree of change in focal length caused by a change in temperature, and focus adjustment is thereupon performed based on this calculation result, has been proposed in U.S. Pat. No. 5,124,738. Such compensation for the fluctuation of the lens back is needed when the camera has high image formation magnification for short-distance photo-taking (as in the case of photoengraving cameras, etc.).

An IC is not ordinarily located in the photo-taking lens barrel. Therefore, where temperature measurement is performed using an IC in the camera body, as in Japanese Laid-Open Patent Hei 4-43310, if the camera's ambient temperature changes markedly and suddenly, the temperature at the temperature measurement point cannot keep pace with the temperature of the photo-taking lens, leading to a large error in temperature measurement, which consequently gives rise to the problem that the temperature of the photo-taking lens cannot be measured correctly. In addition, a construction in which a delay in response is compensated for by means of predicting the tendency of change in temperature of the photo-taking lens based on the output of a temperature detection sensor is proposed in Japanese Laid-Open Patent Hei 4-73627, but it is still difficult to predict the temperature with accuracy where the change in temperature is marked and sudden.

On the other hand, in Japanese Laid-Open Patents Sho 59-160107, Hei 3-181924 and Hei 4-320206 and U.S. Pat. No. 5,124,738, because temperature compensation is performed without reference to the zooming or adjustment of the lens, and correction of the image point position is not directly performed based on the focal length, the fluctuation of the lens back cannot be accurately compensated for.

SUMMARY OF THE INVENTION

The present invention was developed in regard to said situation. Its object is to provide a temperature compensation system for the photo-taking lens capable of performing accurate correction such that the image point, which fluctuates as the temperature of the photo-taking lens changes, can be moved to a prescribed position.

In order to achieve said object, the first invention disclosed in this application involves a system which is mounted in a camera capable of detecting a focal point and which performs temperature compensation with regard to the focal point detection data, wherein said system is located inside the photo-taking lens barrel and comprises a sensor or sensors that output electric signals corresponding to the temperature inside the lens barrel, a temperature measuring means that outputs temperature data regarding the interior of the photo-taking lens barrel based on the output signals from said sensor or sensors, and a correcting means that makes corrections to the focal point detection data based on the temperature data output from said temperature measuring means.

It is desirable that the temperature measurement be performed in certain areas of the camera, such as in lenses sensitive to ambient change in temperature (plastic lenses), or in the area inside the lens barrel falling outside the top one-quarter of the lens barrel defined by a 90-degree arc radiating from the optical axis and facing upward.

Further, the second invention disclosed in this application involves a system that is mounted in a camera capable of detecting a focal point and that performs temperature compensation with regard to the focal point detection data, wherein said system comprises a means to detect the focal length of the photo-taking lens, a means to measure the temperature of said photo-taking lens, a means to calculate the degree of correction based on said detected focal length data and temperature data, and a means to make corrections to the focal point detection data based on the degree of correction calculated by said calculating means.

Furthermore, it is preferable that the system have a means to detect the object distance so that the object distance data is added as one parameter for the calculation of the degree of correction, as well as that the focal point detection data be corrected based on the focal length, object distance and temperature information.

By virtue of said construction, in the first invention of this application, since the focal point detection data is corrected based on the temperature data measured by the temperature measuring means that measures the temperature of the interior of the photo-taking lens barrel, the temperature of the lens elements comprising the photo-taking lens may be accurately measured even if, for example, the camera's ambient temperature has changed markedly and suddenly, allowing appropriate temperature compensation.

In addition, using the second invention, the focal point detection data is corrected based on not only the temperature data but also on the photo-taking lens's focal length data, which allows appropriate temperature compensation even if, for example, the photo-taking lens's focal length has changed.

The object and features of the present invention, which are believed to be novel, are set forth with particularity in the appended claims. The present invention, both as to its organization and manner of operation, together with further objects and advantages, may best be described in connection with the accompanying drawings.

BRIEF DESCRIPTION OF THE DRAWINGS

FIG. 10 is a flow chart showing the process followed for calculation of the lens drive amount in the second embodiment of the present invention.

DETAILED DESCRIPTION OF THE PREFERRED EMBODIMENTS

Embodiments of the present invention are described below with reference to the drawings. First, the first embodiment of the present invention is explained. As described above, because the position of the image point of a zoom lens made mainly of plastic fluctuates easily with a change in temperature, it is necessary to perform accurate corrections so that the image point is placed at a prescribed position. The first embodiment is characterized in that it is equipped with a temperature detecting sensor or sensors that measure the temperature inside the photo-taking lens barrel such that the image point position may be corrected based on the measured temperature.

Figure 1:
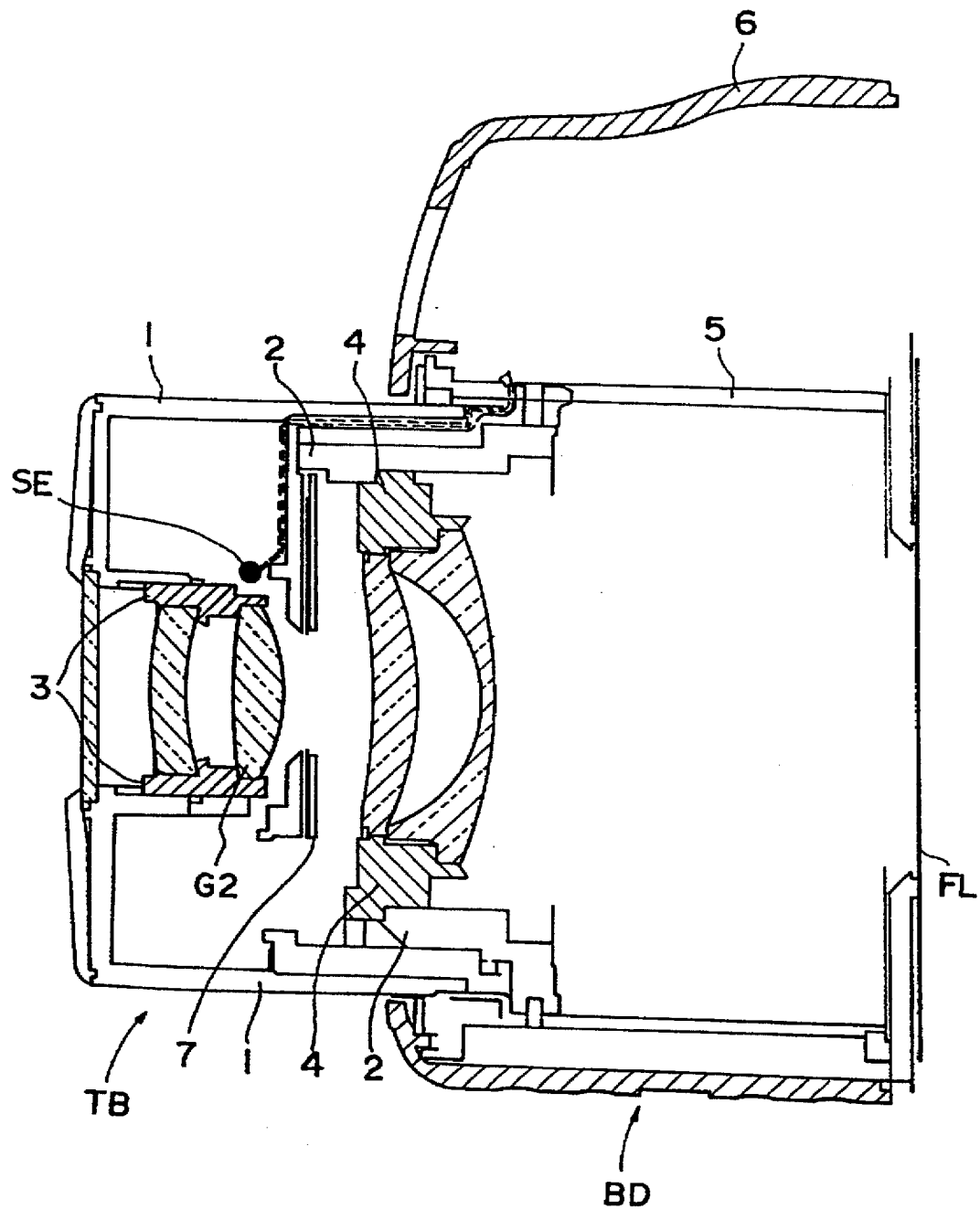
FIG. 1 is a cross-sectional view showing the outline construction of a camera In which the first embodiment of the present invention is used.

FIG. 1 is a cross-sectional view of a lens shutter camera containing a photo-taking lens in which the first embodiment is employed, and shows said camera's construction. This photo-taking lens comprises a two-unit zoom lens system. The first unit is affixed to first unit lens holder 3 and the second unit is affixed to second unit lens holder 4. Cams used for driving the first and second units are located on fixed lens barrel 5: the units are driven by the rotation of first moving lens barrel 1 on which the first unit is supported and that of second moving lens barrel 2 on which the second unit is supported, respectively. Shutter 7 is placed in front of the second unit. In this drawing, 6 is the surface of the camera body, FL is the film surface, TB is the lens barrel, and BD is the camera body.

The first embodiment has a construction in which temperature sensor SE is located in lens barrel TB and the temperature of the photo-taking lens is indirectly measured by measuring the temperature of the interior of the lens barrel. Compensation for the fluctuation of the lens back is performed based on the temperature measured by temperature sensor SE. In addition, it is preferable that temperature sensor SE be located in the area around a lens element which exerts the largest influence in the shift of the image point (fluctuation of the lens back) caused by the change in temperature. In the first embodiment, second lens element G2 acts as such a lens element. Where temperature sensor SE is located near second lens element G2, even if the camera's ambient temperature changes markedly and suddenly, the temperature of the photo-taking lens that causes the image point shift is accurately reflected in the compensation for the fluctuation of the lens back, and as a result, compensation for the fluctuation of the lens back due to the change in temperature may be accurately performed.

Numerical data regarding another zoom lens system which may be used in the first embodiment is shown below. Incidentally, ri (i=1,2,3, . . . ) represents the radius of curvature of an ith lens surface from the object side, di (i=1,2,3,...) represents an ith axial distance from the object side, and Ni (i=1,2,3,....) and vi (i=1,2,3,...) represent the refractive index and Abbe number with regard to the d-line of an ith lens from the object side, respectively. Furthermore, f represents the focal length of the entire system and FNO represents the minimum F-number.

Incidentally, in the numerical data, the surfaces marked with asterisks in the radius of curvature column are aspherical, and are defined by the following equation which represents the surface configuration of an aspherical surface.

$$X = \frac{h^2/r}{1+\{1-\epsilon \cdot (h/r)^2\}^{1/2}} + {}_i \Sigma A_i h^i$$

In said equation, X represents an mount of displacement from the reference surface along the optical axis; r represents a paraaxial radius of curvature; h represents height in a direction vertical to the optical axis; Ai represents an ith-order aspherical coefficient; and $\epsilon$ represents a quadratic surface parameter.

| | | | |
|---|---|---|---|
| f = 38.0~47.8~60.0 | | FNO = 4.4~5.6~7.0 | |
| r1* = 32.156 | | | |
| | d1 = 3.400 | N1 = 1.58340 | ν1 = 30.23 |
| | | | (polycarbonate lens) |
| r2* = 11.345 | | | |
| | d2 = 1.420 | | |
| r3 = 22.877 | | | |
| | d3 = 5.550 | N2 = 1.52510 | ν2 = 56.38 |
| | | | (polyolefine lens) |
| r4 = −12.028 | | | |
| | d4 = 1.000 | | |
| r5 = ∞(aperture) | | | |
| | d5 = 11.392~7.102~3.688 | | |
| r6* = ∞ | | | |
| | d6 = 2.750 | N3 = 1.52510 | ν3 = 56.38 |
| | | | (polyolefine lens) |
| r7 = 145.850 | | | |
| | d7 = 7.250 | | |
| r8 = −9.727 | | | |
| | d8 = 2.500 | N4 = 1.52510 | ν4 = 56.38 |
| | | | (polyolefine lens) |
| r9 = −23.453 | | | |

Figure 2:
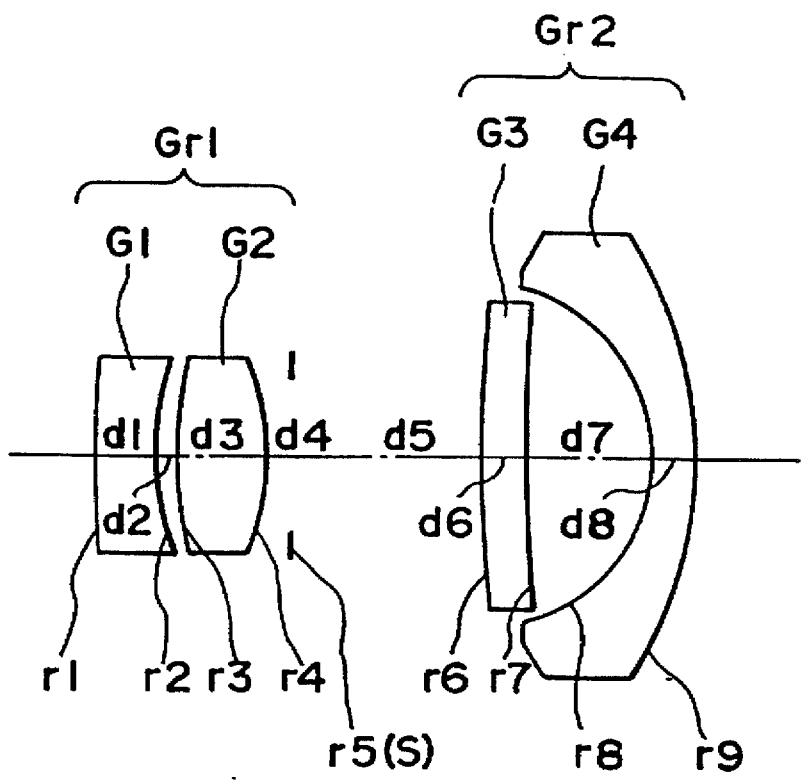
FIG. 2 is an illustration showing the construction of a zoom lens which may be used in the first embodiment of the present invention.

Aspherical surface coefficients
r1:ε=0.10000×10
A4=−0.38294×10$^{-3}$
A6=−0.51809×10$^{-7}$
A8=0.23184×10$^{-8}$
A10=0.25235×10$^{-10}$
r2:ε=0.10000×10
A4=0.37362×10$^{-3}$
A6=0.12697×10$^{-5}$
A8=0.98113×10$^{-8}$
A10=0.41149×10$^{-11}$
r6:ε=0.10000×10
A4=0.60112×10$_{-4}$
A6=−0.20624×10$_{-6}$
A8=0.90545×10$_{-10}$
A10=−0.44973×10$_{-10}$ FIG. 2 is a cross-sectional view showing the construction of said zoom lens system, and shows the positions of lens elements in the shortest focal length condition. This zoom lens system is comprised entirely of plastic: first lens element G1 is comprised of polycarbonate, while second lens element G2, third lens element G3 and fourth lens element G4 are comprised of polyolefine resin.

This zoom lens system comprises, from the object side, first lens unit Gr1 having negative meniscus lens element G1 concave to the image side, positive bi-convex lens element G2 and aperture stop S, and second lens unit Gr2 having plano-concave lens element G3 concave to the image side and negative meniscus lens element G4 concave to the object side. Both surfaces of negative lens element G1 and the object side surface of plano-concave lens element G3 are aspherical. Incidentally, aperture stop S operates as an aperture and a shutter.

Where it is assumed that the degree of change of the refractive index caused by the change in temperature is $\Delta n/\Delta T = -10 \times 10^{-5}$ for both polycarbonate and polyolefine resin, the relationship among the lens elements in terms of the influence exerted over the degree of fluctuation of the lens back ΔLB caused by the change in temperature is shown as $\Delta LB_{(G1)}:\Delta LB_{(G2)}:\Delta LB_{(G3)}:\Delta LB_{(G4)} = -0.35:1:-0.13:-0.04$, assuming the influence exerted by second lens element G2, which has the largest influence (to be described below with reference to Table 1), to be 1.

Figure 3:
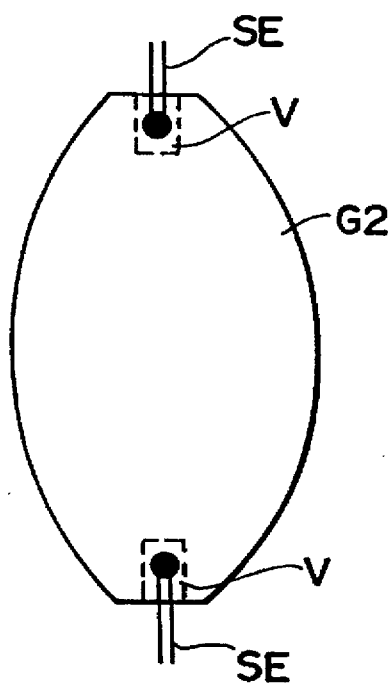
FIG. 3 is a cross-sectional view showing a different arrangement for mounting the temperature sensors that may be employed in the first embodiment of the present invention.

FIG. 3 shows another example of the arrangement of temperature sensors SE. As shown in this drawing, concave units V are located on the edge surfaces of the lens and temperature sensors SE are inserted in them. The temperature of lens element G2 is directly measured with temperature sensors SE in contact with second lens element G2. Such an arrangement of temperature sensors SE can further increase the accuracy of the measurement. While in this example temperature sensors SE are attached to second lens element G2 which is most influenced by a change in temperature, the lens element whose temperature is to be measured may be selected as needed. Incidentally, temperature sensors SE may be affixed to the lens upon insertion by using an adhesive.

For temperature sensor SE, a thermistor (a resistor sensitive to heat) may be employed. Because the resistance of the thermistor varies depending on the temperature, the measured resistance may be converted into temperature. Further, while temperature sensors SE are located at two points in FIG. 3, the number of temperature sensors need not be limited to one or two: by having two or more temperature sensors SE around a single lens or on two or more lenses, accurate temperature measurement, including that of the temperature distribution of the entire system, becomes possible.

Figure 4:
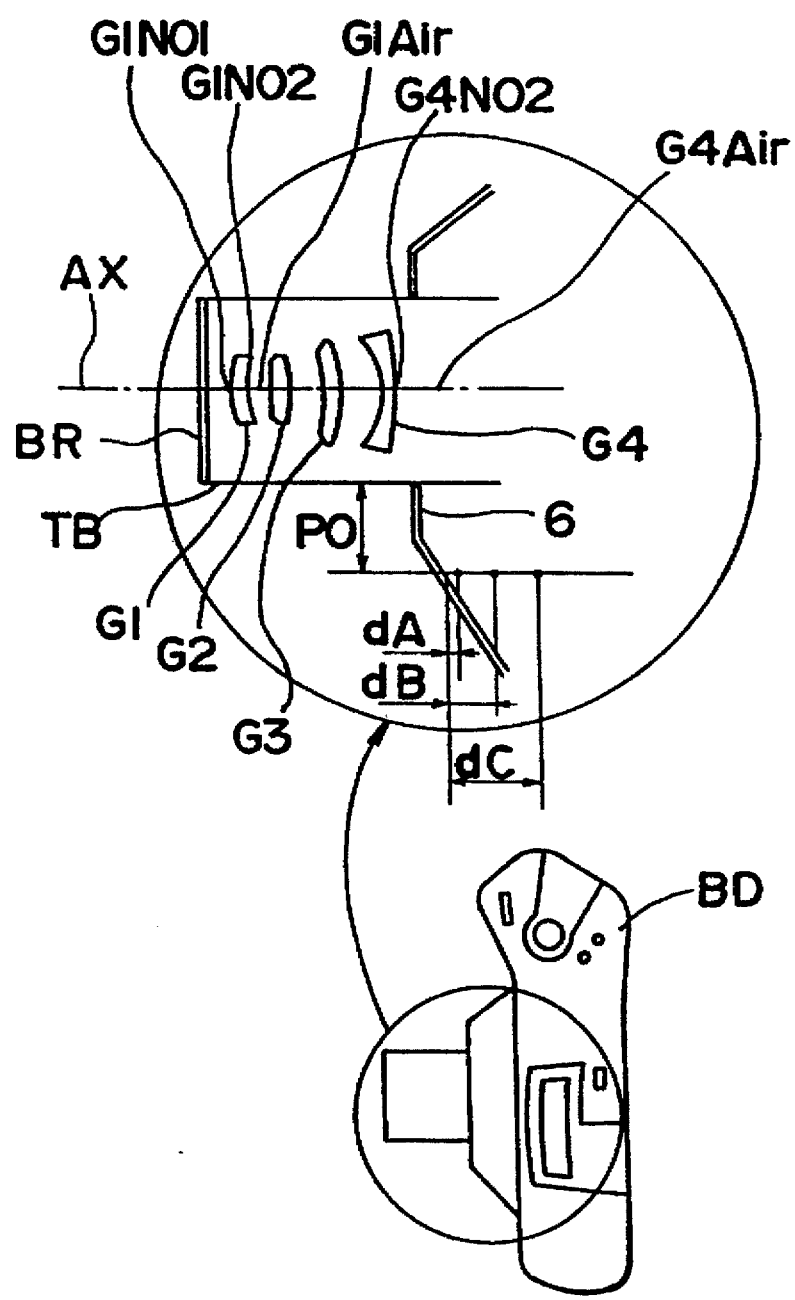
FIG. 4 is an illustration showing the points at which the temperature may be measured in order to check the temperature distribution in a camera in which the first embodiment of the present invention is used.
Figure 5:
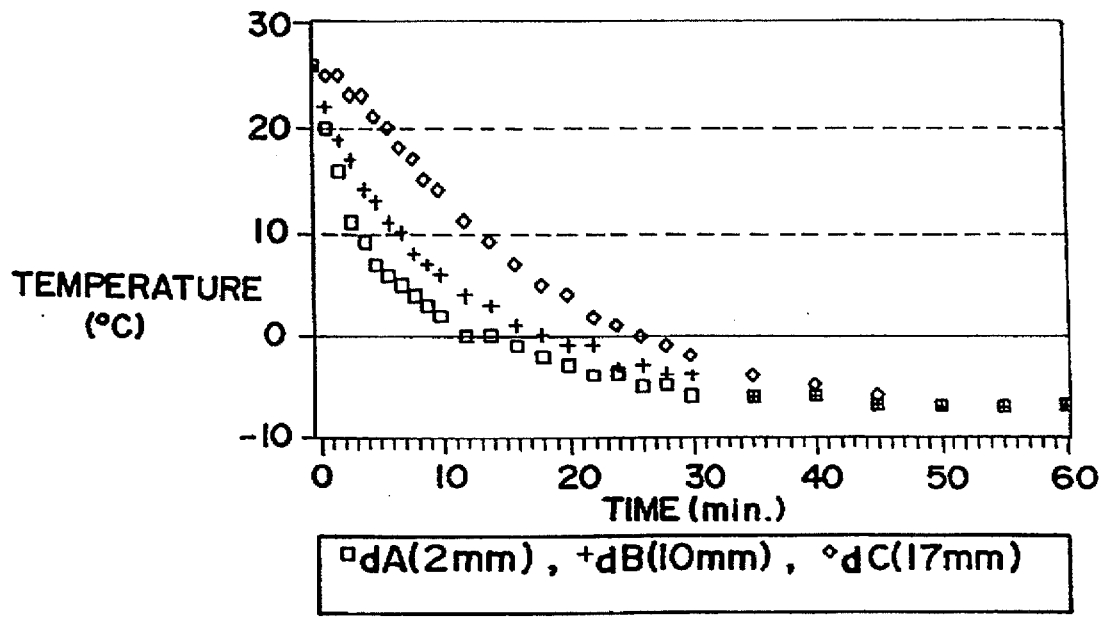
FIG. 5 is a graph showing the change in temperature inside the camera body when the camera shown in FIG. 4 is cooled suddenly.
Figure 6:
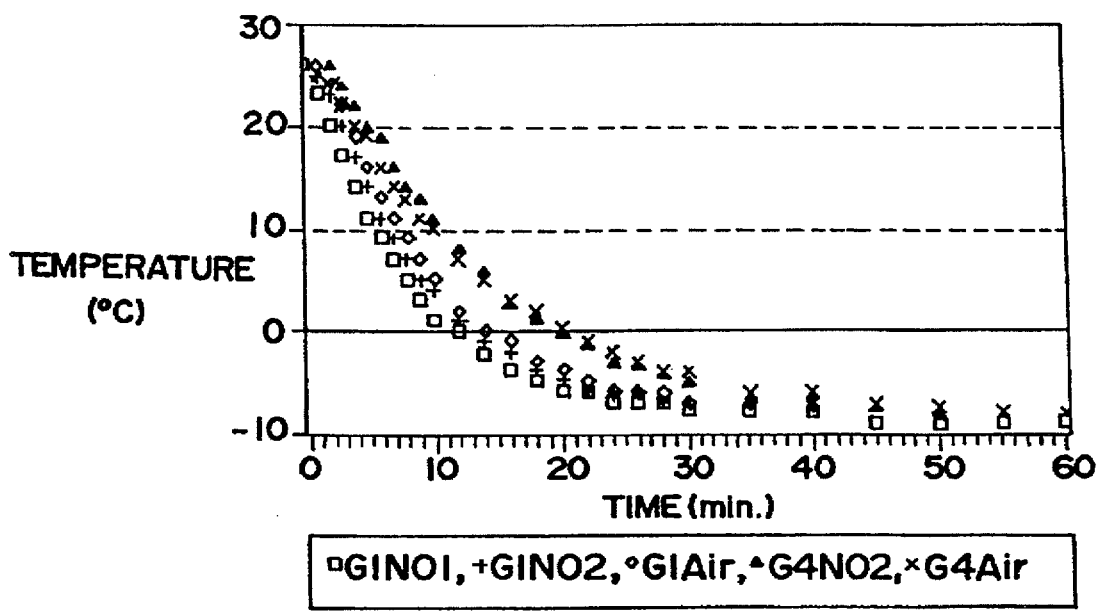
FIG. 6 is a graph showing the change in temperature of the photo-taking lens system when the camera shown in FIG. 4 is cooled suddenly.

Next, the change in temperature distribution inside lens barrel TB and camera body BD when the temperature suddenly changes, as well as the variation in the accuracy of the correction depending on the location of temperature sensor SE, was investigated as explained below. Camera body BD shown in FIG. 4 was employed as a jig and its ambient temperature was caused to drop to −10° C. from room temperature (26° C.) (in other words, the temperature outside lens barrel TB was suddenly changed from 26° C. to −10° C.). The change in temperature inside camera body BD and the change in temperature inside lens barrel TB were measured at prescribed positions and the results are shown in FIG. 5 and FIG. 6, respectively. Incidentally, the zoom lens system shown in FIG. 2 was used as the photo-taking lens system in lens barrel TB. Further, glass barrier BR was placed on the object side of lens barrel TB.

The points where the temperature was measured were point G1NO1 on the object side of first lens element G1, point G1NO2 on the image side of second lens element G2, point G1Air in the layer of air between first lens element G1 and second lens element G2, point G4NO2 on the lens surface on the image side of fourth lens element G4 and point G4Air in the layer of air on the image side of fourth lens element G4. Inside camera body BD (PO (=10 mm) away from lens barrel TB), the points used were depths dA (=2 mm), dB (=10 mm) and dC (=17 mm) from the inner wall of outer body 6 toward the inside of camera body BD along optical axis AX.

From the measurement results (FIGS. 5 and 6), it was learned that there is a maximum 10° C. difference in temperature between G1, which is located at the top of the lens system, and G4, which is located at the end of the lens system, that temperature varies greatly depending on the difference in the thickness of layer of air inside camera body BD—there is a maximum 15° C. difference with a 15 mm thick layer of air—and that it requires approximately 40 minutes for the temperature of the entire lens system to become uniform.

In addition, based on the temperature measurement data shown in FIGS. 5 and 6, the largest balance of compensation at each temperature measurement point was calculated and the results are shown in Table 1. This largest balance of compensation refers to the largest of the lens back fluctuation amounts for the entire photo-taking lens system calculated based on the difference between the temperature at a reference point and the temperature of each lens element when the ambient temperature is suddenly changed from a certain level, as well as the simulated lens back fluctuation mount of each lens element resulting from a change in temperature.

Said lens back fluctuation mount of each lens element resulting from a change in temperature represents the degree of influence that each lens element exerts over the lens back fluctuation [of the entire system] per one degree Centigrade, and may be calculated in advance via simulation. The lens back fluctuation mount of the ith lens element Gi resulting from a change in temperature is shown as $\Delta G_i$ below.

The simulated lens back fluctuation mount $\Delta G_i$ for each lens element of the photo-taking lens in FIG. 2 is shown below. From these simulation values, it is clear that lens back fluctuation mount $\Delta G_2$ for second lens element G2 resulting from a change in temperature is the largest.
$\Delta G_1 = 0.02$ mm/° C.
$\Delta G_2 = -0.06$ mm/° C.
$\Delta G_3 = 0.003$ mm/° C.
$\Delta G_4 = 0.01$ mm/° C.

Said largest balance of compensation was calculated as explained below. First, it was assumed that there is linearity in the tendency of the change in temperature based on the actual measurement results shown in FIGS. 5 and 6 (for example, the tendencies of change in temperature at temperature measurement points G1NO1 and G4Air). Then, the temperature of first lens element G1 ($T_1$), that of second lens element G2 ($T_2$), that of third lens element G3 ($T_3$) and that of fourth lens element G4 ($T_4$) were predicted from these graphs. Temperature measurement points corresponding to these predicted temperatures, the points in the layer of air between first lens element G1 and second lens element G2 (G1Air) and the temperature measurement points in the camera body at depth dB (=10mm) and depth dC (=17 mm) were deemed as the reference points.

Then, taking as the reference point one of the temperature measurement points corresponding to the predicted temperatures ($T_1, T_2, T_3, T_4$) for the lens elements, the points in the layer of air (G1Air) between first lens element G1 and second lens element G2 and the temperature measurement points in the camera body (dB, dC), the differences $\Delta t_i$ between the temperature at that reference point, and the predicted temperatures for other lens elements Gi, were obtained. These temperature differences $\Delta t_i$ are, if the temperature measurement point for third lens element G3 is deemed to be the reference point, $\Delta t_1 = T_1 - T_3$, $\Delta t_2 = T_2 - T_3$, and $\Delta t_4 = T_4 - T_3$.

The addition of the products of said lens back fluctuation amount $\Delta G_i$ due to a change in temperature and the temperature difference $\Delta t_i$ for each lens element is the compensation balance. For example, if the temperature measurement point for third lens element G3 is deemed to be the reference point, the compensation balance will be $\Delta G_1 \Delta t_1 + \Delta G_2 \Delta t_2 + \Delta G_4 \Delta t_4$.

Table 1 shows the largest balance of compensation from among the compensation balances for each temperature measurement point at various measurement times. From these results, it is seen that accuracy in compensation varies depending on the temperature measurement point. It is further seen that the target temperature compensation cannot be achieved unless the temperature inside lens barrel TB is measured, and that compensation for the fluctuation of the lens back can be performed quite accurately even after a sudden change in temperature if the temperature of second lens element G2 is measured, because the temperature of second lens element G2 has the largest influence over the shift of the image point.

TABLE 1

| Reference point (measurement point) | Largest balance of compensation |
| --- | --- |
| Inside camera body, dB (10 mm) | 1.5 mm |
| Inside camera body, dC (17 mm) | 2.9 mm |
| G1 | 0.1 mm |
| Layer of air between G1 and G2 | 0.05 mm |
| G2 | 0.01 mm |
| G3 | 0.1 mm |
| G4 | 0.2 mm |

The change in temperature inside lens barrel TB (FIG. 4) caused by direct sunlight is explained below with reference to FIG. 7. Temperature sensors SE are placed around second lens element G2 (FIG. 4) inside lens barrel TB (four points: top, bottom, left and right). The change in temperature when direct sunlight is received from the upper left of lens barrel TB in the longest focal length condition was measured, the result of which is shown in FIG. 7.

Figure 7:
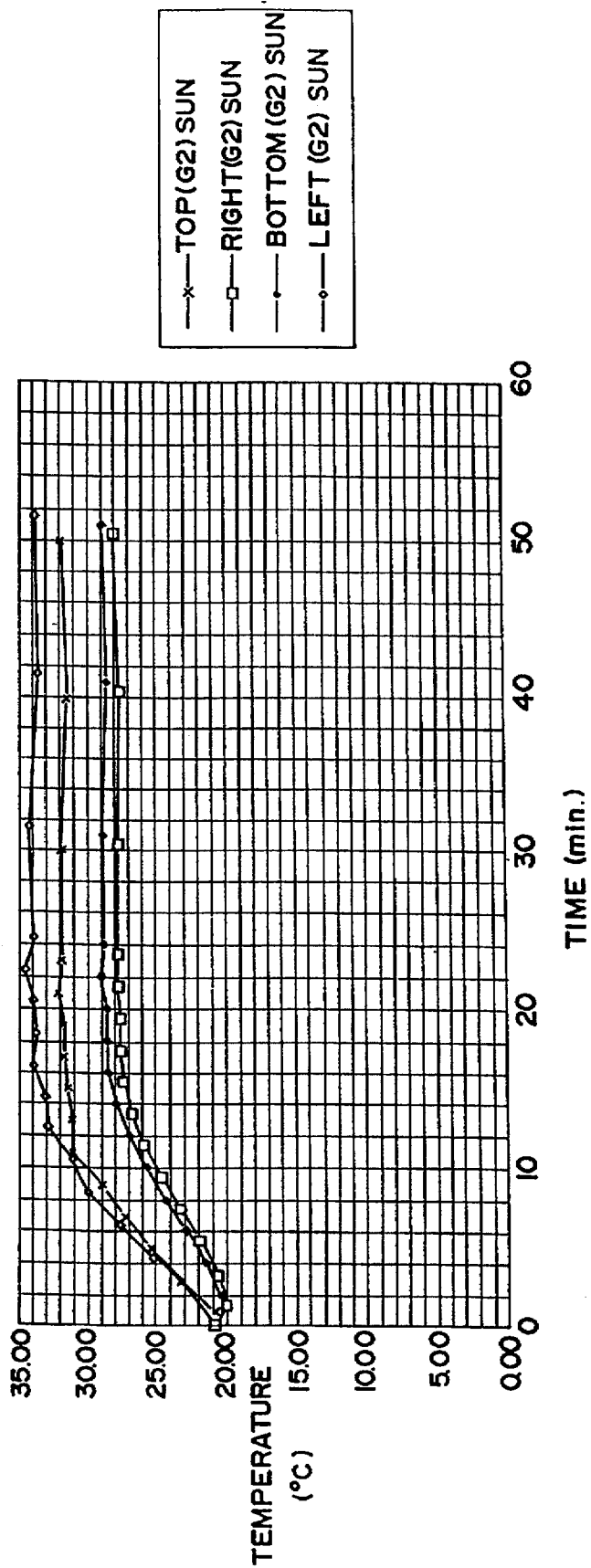
FIG. 7 is a graph showing the change in temperature of various parts of the lens barrel when the lens barrel which may be used in the first embodiment of the present invention receives direct sunlight.

From the measurement result shown in FIG. 7, it was learned that there is an approximately 10° C. maximum temperature differential between the side on which the sun shines (the upper left side of lens barrel TB) and the opposite side (the lower right side of lens barrel TB) and that the degree of compensation for the fluctuation of the lens back varies significantly depending on which point is used for the measurement.

In order to deal with this difference in temperature, the constructions described below may be used. In the first construction, temperature sensors SE are placed inside lens barrel TB such that the temperature is measured at four points, i.e., top, bottom, left and right, and the compensation for the fluctuation of the lens back is performed using the average of the measurement results for the four temperature sensors SE.

Figure 8:
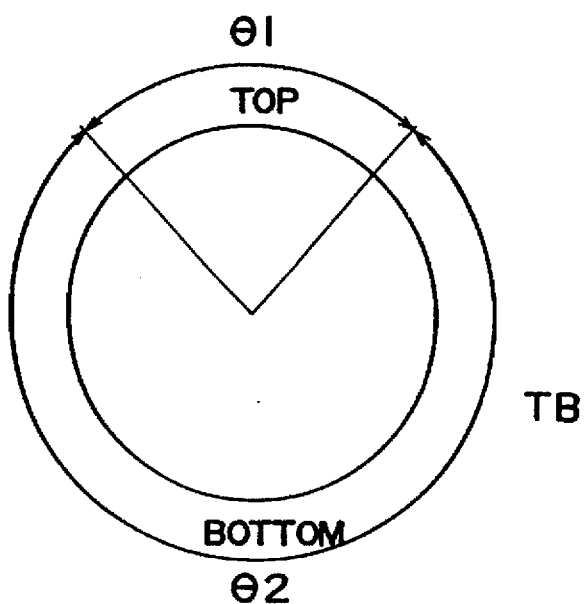
FIG. 8 is a cross-sectional view of the lens barrel showing the area susceptible to the influence of change in temperature when direct sunlight is received.

The second construction is a construction which does not perform temperature measurement in areas where there is a marked and sudden change in temperature. FIG. 8 shows a cross-section of lens barrel TB, and $\theta 1$ is an area where the change in temperature is marked due to direct sunlight, while $\theta 2$ is an area where the change in temperature caused by direct sunlight is not marked. Temperature sensors SE may be placed in area $\theta 2$.

Where the temperature of the lens barrel changes due to its receiving direct sunlight, the temperature in the vicinity of the surface of the lens barrel on which the sun shines (area $\theta 1$) changes markedly and suddenly, As a result, the difference between this temperature and the temperature of the photo-taking lens system itself becomes large. Therefore, if the temperature measured in area $\theta 1$ is employed, the temperature of the photo-taking lens itself, which is the cause of the shift of the image point, is not properly reflected in the compensation for the fluctuation of the lens back. In order to properly compensate for the fluctuation of the lens back, it is desirable to employ an average temperature as in said first construction: however, if temperature measurement in the area where the temperature markedly and suddenly changes due to direct sunlight is avoided, a measurement value closer to the true temperature of the photo-taking lens may be obtained.

For example, during the daytime, when there is strong sunlight, $\theta 1 = 90°$ and $\theta 2 = 270°$ in FIG. 8. If the temperature in the area outside the 90° area (=$\theta 1$) facing upward inside lens barrel TB, i.e., $\theta 2$, is employed as the temperature to be used in connection with the compensation for the fluctuation of the lens back, the error in temperature measurement due to the effect of the sunlight may be reduced.

A second embodiment in which compensation for the shift of the image point (degree of fluctuation of the lens back) caused by a change in temperature is performed is explained below. The second embodiment is characterized in that the temperature compensation is performed in a zoom lens system using such parameters as the focal length and object distance. In other words, the characteristics lie in the method of compensation in which the lens drive compensation mount is calculated based on the temperature and focal length or the temperature and object distance and in which the correction of the image point position is performed based on said result.

Due to the construction in which the temperature compensation is performed using the object distance and the focal length as described above, highly accurate focus adjustment may be achieved even where the focal length has changed. In addition, because the lens drive compensation amount is calculated using the object distance data in addition to the temperature and focal length data as calculation parameters, correction with higher accuracy may be performed.

Figure 9:
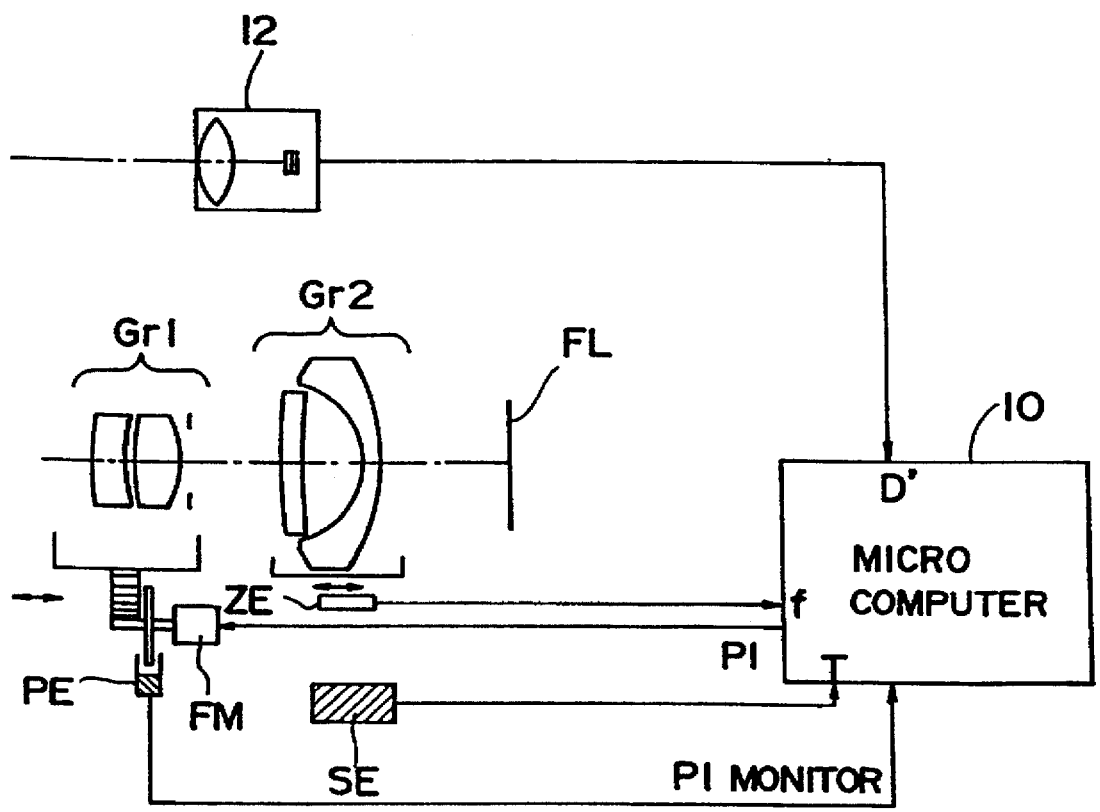
FIG. 9 is a block diagram showing the outline construction of the camera in which the second embodiment of the present invention is used.

FIG. 9 shows an outline construction of a camera in which the present invention is applied. Zoom encoder ZE detects the focal length of the photo-taking lens (the zoom lens system shown in FIG. 2). Temperature sensor SE measures the temperature of the photo-taking lens. Microcomputer 10 calculates the lens drive compensation amount as to first lens unit Gr1 based on focal length f and temperature T, and then regulates the correction of the position of image point of the photo-taking lens based on the result of this calculation. Incidentally, 12 is an FA module and FL is the film surface.

In this system, shifting of the first lens unit (shifting for focusing and compensation for the fluctuation of the lens back) is achieved using focusing motor FM. The lens drive operation is regulated by pulse encoder PE which counts the increments of shifting of first lens unit Gr1. In other words, microcomputer 10 monitors the amount of shift of first lens unit Gr1 by means of the PI information from pulse encoder PE ('PI monitor' in FIG. 9) and regulates the amount of shift of the first lens unit based on the result of said monitoring.

Focal length f is detected by incorporating the amount of shift of second lens unit Gr2 into microcomputer 10 by means of zoom encoder ZE. Temperature sensor SE is located inside the lens barrel, and as described above, it is preferable to place it near second lens unit Gr2 to increase measurement accuracy.

The operation for calculating drive amount L is explained in accordance with the flow chart shown in FIG. 10. When a trigger signal is given to microcomputer 10 by turning the release switch ON, for example, microcomputer 10 obtains temperature information T from temperature sensor SE (#10). Then, by performing correction by means of adding temperature compensation value α (T) to object distance information D' obtained from AF module 12, true object distance D is calculated (#20).

The correction using temperature compensation value α (T) will now be explained. In the active AF system, light is shed upon the object using a light-projecting LED (light emitting diode) and information regarding the object distance is obtained based on the position of the reflected light that returns to the light-receiving sensor. A change in temperature causes a discrepancy in the object distance information because the distance between the light-projecting LED and the light-receiving sensor or the distance between the lens of the light-projecting LED and the lens of the light-receiving sensor changes from one temperature to another.

Therefore, the true object distance can be expressed by the following equation (F1).

$$D = \alpha(AH + \Delta AHt)$$
$$= \alpha \times AH + \alpha \times \Delta AHt$$
$$= D' + \alpha(T) \text{ --- (F1)}$$

In this equation, AH represents the location of the reflected light on the light-receiving sensor (the distance from a prescribed reference position); ΔAHt represents the mount of shift due to the temperature change (known value obtained by actual measurement or simulation); and α represents a coefficient to convert the position on the sensor into object distance.

As shown above, compensation for the fluctuation of the lens back may be performed with higher accuracy by separately performing a calculation to correct the object distance in connection with AF module 12.

In addition, a construction in which the calculation of the temperature compensation value α (T) used in the calculation of object distance D is performed separately based on the temperature measured by a temperature sensor different from temperature sensor SE and located near AF module 12 may also be employed. In this construction, the quality of the camera (confirmation of the object distance information, etc.) can be checked for the lens block and the AF block separately, allowing easy resolution of the problems in connection with the respective blocks. In other words, if temperature compensation is performed accurately for the AF block, it may be easily determined whether the distance detected for the lens block is accurate.

Next, lens back fluctuation compensation value ΔL is calculated from focal length information f obtained from zoom encoder ZE, temperature information T and object distance information D described above (#30). Then, lens drive amount L is calculated by adding lens back fluctuation compensation value ΔL to room temperature (20° C.) lens drive amount L(20) (#40).

As described above, because microcomputer 10 calculates the lens drive compensation amount for first lens unit Gr1 based on focal length f detected by zoom encoder ZE and object distance information D' detected by AF module 12, even where focal length f of the photo-taking lens has changed, the correction of the image point position necessitated by a change in temperature may be accurately performed in accordance with said focal length f. In this way, the accuracy of focusing is improved.

Figure 11:
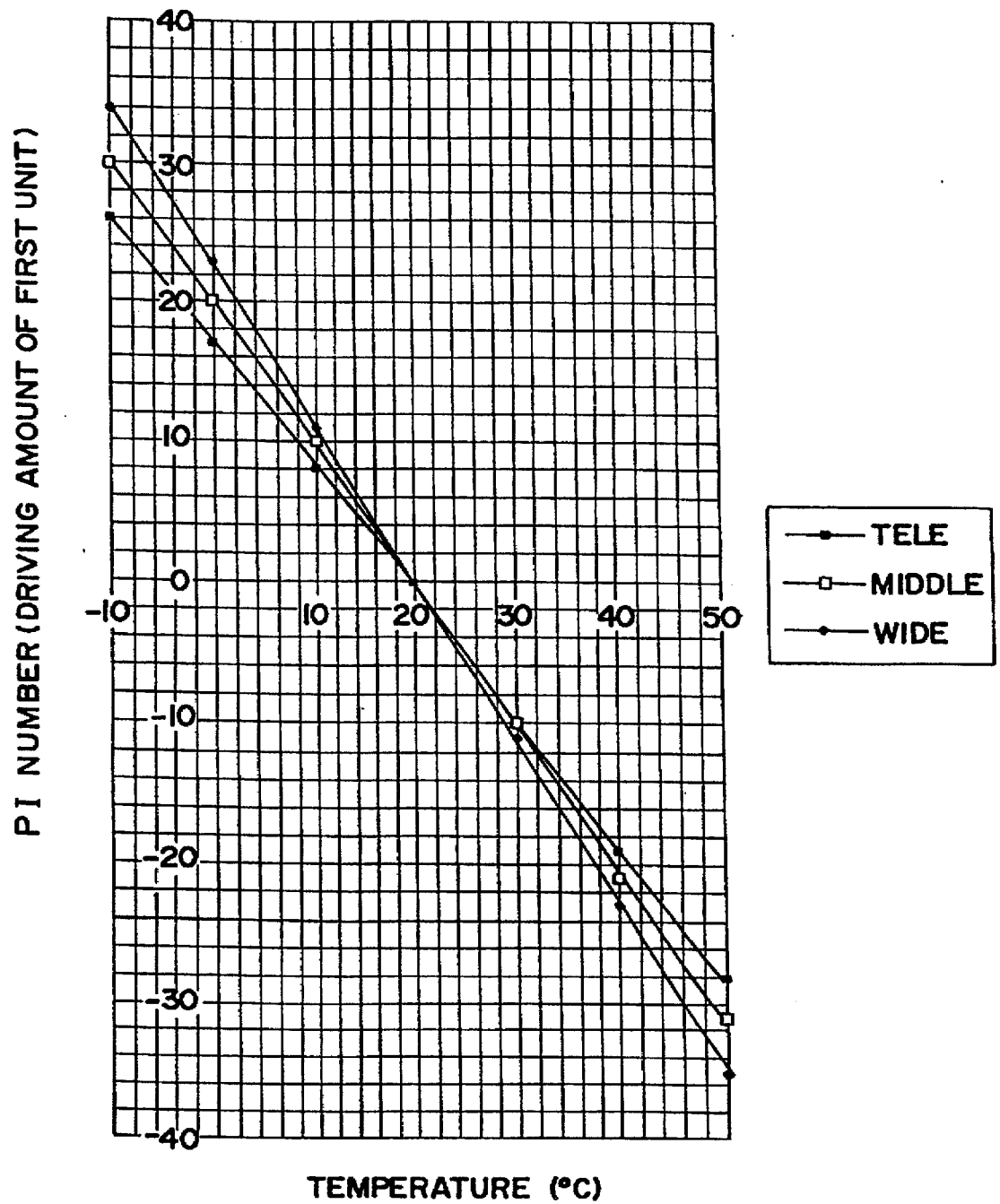
FIG. 11 is a graph showing the relationship among the temperature, the focal length and the degree of compensation for the fluctuation of the lens back in the second embodiment of the present invention.
Figure 12:
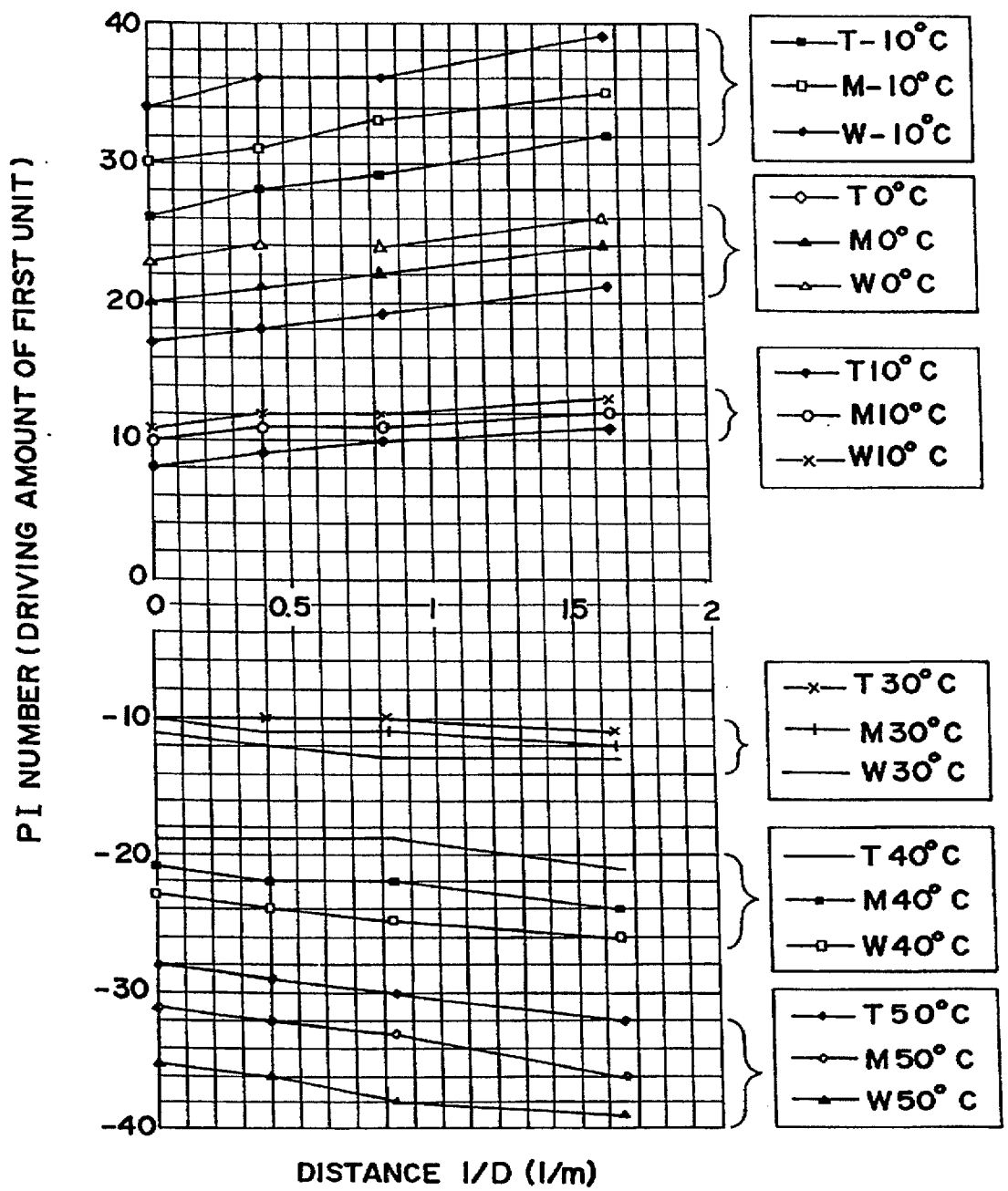
FIG. 12 is a graph showing the relationship among the object distance, the focal length, the temperature and the degree of compensation for the fluctuation of the lens back in the second embodiment of the present invention.

The method of calculation of said lens drive amount L is explained below. FIGS. 11 and 12 show the relationship among the temperature, focal length and object distance in terms of the compensation amount for the fluctuation of the lens back (simulated value employing the zoom lens system in FIG. 2). In other words, FIG. 11 shows lens drive amount L for first lens unit Gr1 required in order to move the position of the image point, which fluctuates with the change of temperature of the zoom lens system, to a prescribed position with regard to each focal length f (the longest, middle and shortest focal lengths) when the object is at the infinity position (D=∞). FIG. 12 shows lens drive amount L for first lens unit Gr1 required in order to move the position of the image point, which fluctuates with the change of object distance D (in this drawing, the lateral axis represents 1/D), to a prescribed position with regard to each focal length f (the longest, middle and shortest lengths) as well as each temperature (−10° C., 0° C., 10° C., 30° C., 40° C., 50° C.).

In these drawings, TELE (T) means the longest focal length condition (f=38.0), MIDDLE (M) means the middle focal length condition (f=47.8) and WIDE (W) means the shortest focal length condition (f=60.0). Further, in regard to the PI numbers on the vertical axis, positive numbers indicate movement in the direction of the image side (the direction of shift of the lens toward infinity from the closest object position). These PI numbers represent the lens drive mount for first lens unit Gr1, and the PI monitoring regarding the lens drive mount takes place using the pulses intermittently sent from pulse encoder PE (FIG. 9), in which one pulse count is interpreted as 1 PI (1 PI approximates to 4.4 μ m).

It can be seen from FIGS. 11 and 12 that the degree of the fluctuation of the lens back varies depending on the degree of change in temperature T0–T (T0 represents the reference temperature while T represents the measured temperature), focal length f and object distance D, respectively. Therefore, in the calculation of lens drive mount L, first, focal length f is divided into three zones and the compensation for the fluctuation of the lens back is performed for each zone. Second, because the fluctuation of the lens back due to the change in temperature (T0–T) takes place in a linear fashion, the correction is performed via linear interpolation. Third, while the fluctuation of the lens back due to the change of object distance D takes place in a linear fashion, since the degree of fluctuation is small, the object distance is divided into zones and the compensation for the fluctuation is performed using constants.

Lens drive amount at 20° C. L(20) is expressed by a PI number which indicates zooming of the lens from the reference position (namely, the closest object position) toward the infinity position. Zooming toward the infinity position here means that the focusing lens (first lens unit Gr1) is moved such that the camera becomes focused on an object located at infinity. The infinity position refers to the position that requires the smallest lens drive amount, and the closer the object is, the more the lens is zoomed to the object side. Because the position at which the lens is maximally zoomed out (the infinity position) is the initial position in this system, the larger the object distance is, the more first lens unit Gr1 needs to move toward the image side.

Lens drive amount L(20) is obtained by using one of the different zones for focal length f and object distance D and by performing linear interpolation via the following equation (1).

$$L(20) = Pij \times SP/16 + Qij + Kf \quad (1)$$

In this equation, i represents one of the three object distance zones (far, middle or close); j represents one of the three focal length zones (telephoto, middle or wide); Pij represents the gradient coefficient for each object distance and focal length zone (=a constant: multiplied by 16 in order to obtain an integer value); SP represents the step number for the object distance (the object distance ranges from 0.598 m to infinity and is divided into steps 0 to 129); Qij represents the constant for each object distance and focal length zone; and Kf represents the reference lens drive amount (the number of PIs from the initial lens position to the closest object position).

Lens drive mount ΔL when the temperature has changed from 20° C. to measured temperature T is obtained by using one of the different zones for temperature T and focal length f as well as temperature T and object distance D, and then providing relevant constants and performing linear interpolation via the following equation (2).

$$\Delta L = L(T) = Xej \times (T0-T)/16 + Yej + Zie \quad (2)$$

In said equation, e represents one of the three zones of temperature (low temperature, room temperature or high temperature); j represents one of the three focal length zones (telephoto, middle or wide); Xej represents the gradient coefficient for each temperature and focal length zone (=a constant: multiplied by 16 in order to obtain an integer value); T represents the measured temperature; T0 represents the reference temperature (=10° C.); Yej represents the constant for each temperature and focal length zone; and Zie represents the compensation value for each object distance and temperature zone.

Said reference temperature T0 was determined in order to facilitate the calculation of the compensation value. This was determined to be 10° C. so that the change in temperature(T0–T) does not change from positive to negative or vice versa. In addition, said Zie is determined based on the temperature and object distance as shown in the map in Table 4, described below. This map was obtained from the graph in FIG. 12 showing the relationship between object distance D and measured temperature T, taking allowable levels into consideration.

The total lens drive amount L is the addition of said L(20) and L(T), and is obtained using the following equation (3).

$$L = \{Pij \times SP + Xej \times (T0-T)\}/16 + Qij + Yej + Zie + Kf \quad (3)$$

Said constants are stored in the camera EEPROM (not shown in the drawings). Maps for the calculation are shown in the following Tables 2 through 4. While compensation based on the object distance is performed using the constant Zie in the maps, it may also be carried out using linear interpolation, as when the compensation is done based on the focal length. Incidentally, because the data regarding the object distance and temperature (measurement results according to 1° C. increments) is digitally constructed, the borders between zones do not overlap (digital resolution). In addition, because the focal length is divided into three zones by virtue of the ON and OFF switching information of zoom encoder ZE, the borders between zones overlap.

Since linear interpolation is employed in the compensation for the fluctuation of the lens back as described above, the EEPROM should hold only coefficient data, which helps reduce the size of the ROM. Incidentally, quadratic interpolation may be used in place of linear interpolation. In other words, while linear interpolation is performed by using different gradient coefficients for each of the three zones in the compensation based on the focal length and temperature, if interpolation is made by using a quadratic equation, more accurate compensation for the fluctuation of the lens back may be performed.

TABLE 2

Amount of lens drive (at room temperature) for all-plastic lens

| i | Object Distance (m) | SP | j f | 1 (tele) 58.2–51.8 | 2 (middle) 51.8–45.5 | 3 (wide) 45.5–39.1 |
|---|---|---|---|---|---|---|
| 1 | ∞–1.677 | 83–129 | Pij | 31 | 30 | 30 |
|   |         |        | Qij | 18 | 19 | 16 |
| 2 | 1.642–0.830 | 36–82 | Pij | 34 | 33 | 33 |
|   |             |       | Qij | 6  | 5  | 3  |
| 3 | 0.821–0.598 | 0–35  | Pij | 36 | 35 | 34 |
|   |             |       | Qij | 0  | 0  | 0  |

TABLE 3

Correction based on focal length and temperature

| e | T (°C.) | T0 (°C.) | j f | 1 (tele) 58.2–51.8 | 2 (middle) 51.8–45.5 | 3 (wide) 45.5–39.1 |
|---|---|---|---|---|---|---|
| 1 | −10–10 | 10 | Xej | 15 | 16 | 19 |
|   |   |   | Yej | 9 | 10 | 12 |
| 2 | 11–29 | 10 | Xej | 14 | 16 | 18 |
|   |   |   | Yej | 9 | 10 | 11 |
| 3 | 30–50 | 10 | Xej | 14 | 17 | 19 |
|   |   |   | Yej | 8 | 11 | 13 |

TABLE 4

Correction based on object distance and temperature

| i | Object Distance (m) | SP | o Temp. (°C.) | 1 −10–10 | 2 9–29 | 3 30–50 |
|---|---|---|---|---|---|---|
| 1 | ∞–1.677 | 83–129 | Zie | 0 | 0 | 0 |
| 2 | 1.642–0.830 | 36–82 | Zie | 1 | 0 | −1 |
| 3 | 0.821–0.598 | 0–35 | Zie | 3 | 0 | −2 |

The calculation of reference lens drive amount Kf is explained below. Normally, due to variation experienced in the lens and lens barrel manufacturing and assembly processes, the image point is not positioned properly. To correct this situation an adjustment must therefore be performed during the final assembly process of the camera. There are two methods to correct this discrepancy: one is a mechanical method in which the correction is made by shifting the position of the lens barrel, and the other is an electrical method in which the correction is made by inputting a corrective amount of lens drive to the EEPROM. For photo-taking lenses in which the lens back fluctuates due to changes in temperature, as in the case of the photo-taking lens in which the present application may be applied, it is necessary to change the degree of compensation for the fluctuation of lens back with regard to the temperature in this adjustment process as well.

Figure 13:
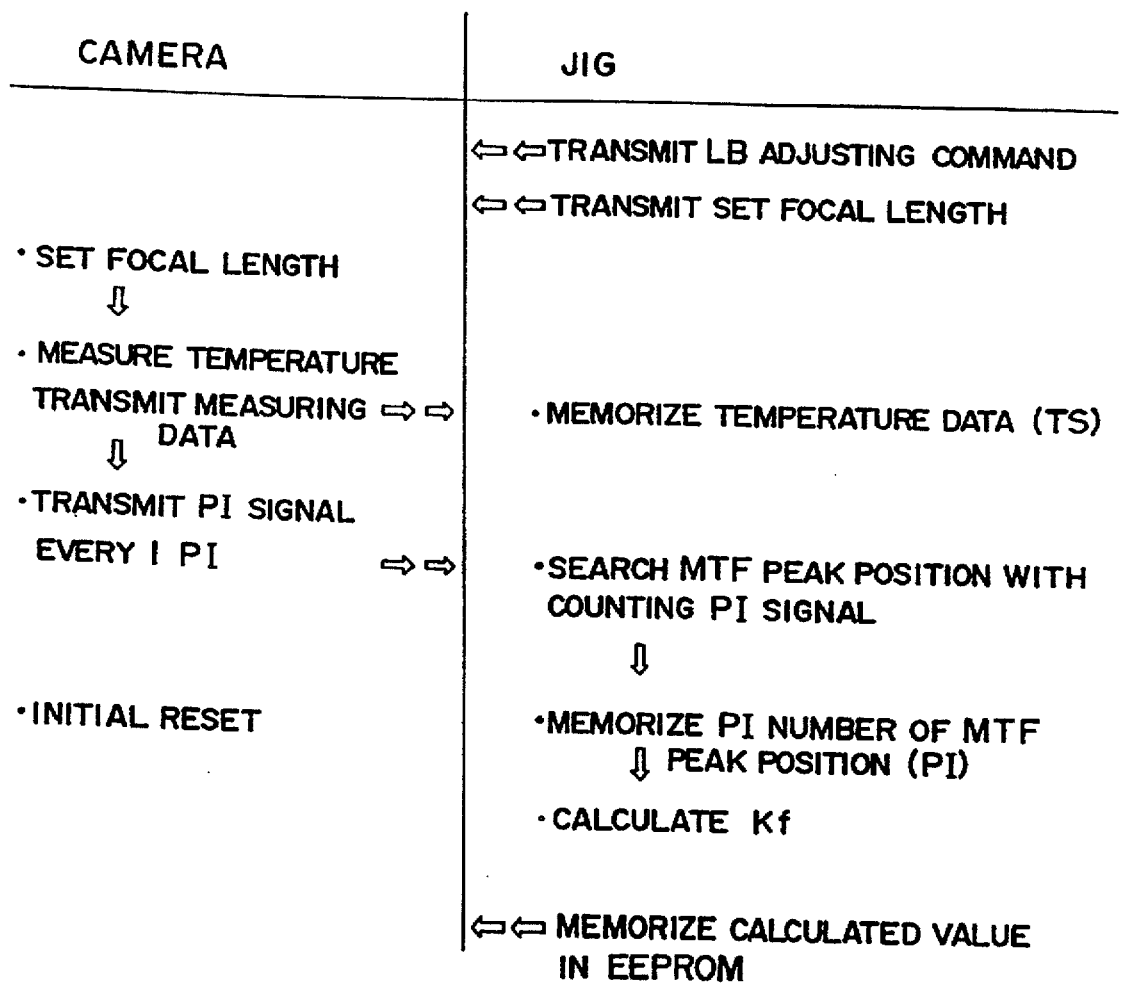
FIG. 13 is a drawing showing the process followed for calculation of the reference lens drive amount Kf in the second embodiment of the present invention.

The method of compensating for the fluctuation of the lens back electrically using a jig, as shown in FIG. 13, is explained here. This drawing shows the flow of signals between microcomputer 10, temperature sensor SE or zoom encoder ZE of the camera shown in FIG. 9 and the jig microcomputer (not shown in the drawings). First, performance of lens back adjustment is instructed by sending a lens back adjustment command signal from the jig microcomputer to camera microcomputer 10. Then, by sending a set focal length signal from the jig microcomputer to camera microcomputer 10, it is instructed which of the telephoto, middle and wide zones is to be used.

Camera microcomputer 10 moves the lens in accordance with focal length f thus instructed. The temperature of the photo-taking lens is then measured by temperature sensor SE (FIG. 9) placed in the camera and the measurement data is sent to the jig microcomputer. The jig microcomputer stores the temperature data TS output from temperature sensor SE of the camera.

When camera microcomputer 10 moves the focusing lens (first lens unit Gr1) in the direction of the infinity position from the initial closest object position, zoom encoder ZE of the camera sends a PI signal to the jig microcomputer for every 1 PI as the focusing lens is moved. The jig microcomputer looks for the MTF (modulation transfer function) peak point while counting the PI signals. The MTF peak point (which has spatial frequency of approximately 20) is the image point position with the highest contrast, and the film is normally located at this peak point. While the initial reset takes place on the side of the camera, the jig microcomputer calculates the Kf value in a manner described below after storing the number of PIs when the MTF peak occurs. When the Kf value obtained through the calculation is stored in the camera EEPROM, the Kf setting operation is complete.

The calculation of reference lens drive amount Kf for correction of the image point position necessitated by a change in temperature is explained below. The focal length is divided into different zones, and the Kf value is calculated using the following equations (4) through (8). In this disclosure, equations used when the focal length is divided into five zones (telephoto, telephoto to middle, middle, middle to telephoto, telephoto) are shown. The number of zones is increased from three to five here because while zooming is a relative amount indicated by the amount of shift from a reference position, Kf is a value to determine the absolute amount of shift for the lens to reach the reference position, which requires higher precision.

The Kf value for the telephoto zone (Kf(t)) is calculated using equation (4).

$$Kf(t)=PI(t)-Q1j-Y2j-\{P1j \times SP+X2j \times (10-TS(t))\}/16 \quad (4)$$

The Kf value for the middle zone (Kf(m)) is calculated using equation (5).

$$Kf(m)=PI(m)-Q1j-Y2j-\{P1j \times SP+X2j \times (10-TS(m))\}/16 \quad (5)$$

The Kf value for the wide zone (Kf(w)) is calculated using equation (6).

$$Kf(w)=PI(w)-Q1j-Y2j-\{P1j \times SP+X2j \times (10-TS(w))\}/16 \quad (6)$$

The Kf value for the zone between telephoto and middle (Kf(tm)) to be calculated via interpolation is calculated using equation (7).

$$Kf(tm)=\{Kf(t)+Kf(m)\}/2 \quad (7)$$

The Kf value for the zone between middle and wide (Kf(mw)) to be calculated via interpolation is calculated using equation (8).

$$Kf(mw)=\{Kf(m)+Kf(w)\}/2 \quad (8)$$

In said equations (4) through (8), PI(t) represents the number of PIs for lens drive in the telephoto condition (f=58.2 mm); PI(m) represents the number of PIs for lens drive in the middle focal length condition (f=48.3 mm); PI(w) represents the number of PIs for lens drive in the wide condition (f=39.1 mm); TS(t) represents the measured temperature in the telephoto condition; TS(m) represents the measured temperature in the middle focal length condition; and TS(w) represents the measured temperature in the wide condition.

Adjustment and measurement during the final assembly process for the camera normally take place in an air-conditioned room. Where the fluctuation of lens back due to temperature change is marked, the final assembly process should occur in a constant-temperature room in which the temperature is controlled more strictly (an environment in which a certain room temperature is maintained). However, if the correction value Kf to be input is calculated using the temperature of the photo-taking lens measured by temperature sensor SE (the measured temperature data from the sensor) on the side of the camera (the sensor is not limited to one located in lens barrel TB and may be located in camera body BD) as described above, such a constant-temperature room becomes unnecessary, making adjustment of the focus position (namely, lens back adjustment in which the lens drive reference amount is determined) with high accuracy possible under any environment.

What is claimed is:

1. An optical device comprising:

a lens system having at least one lens element, a lens barrel for containing the lens system therein, said lens barrel having a cylindrical surface and a cylindrical interior volume divided into an upper quadrant region, which is located between the center axis of said cylindrical interior volume and an upper quarter segment of said cylindrical surface, and a lower three quadrant region, which is located between said center axis and the remaining lower three quarter segment of said cylindrical surface;

a temperature sensor which is provided inside of the lens barrel, said temperature sensor being located within said lower three quadrant region of said interior volume of said lens barrel.

2. The optical device as claimed in claim 1, wherein said lens system includes at least one sensitive lens element which is sensitive to temperature change.

3. The optical device as claimed in claim 2, where said temperature sensor is positioned substantially in the plane of the sensitive lens element and offset from the periphery thereof.

4. The optical device as claimed in claim 1, wherein said temperature sensor is located in the periphery of the lens element.

5. The optical device as claimed in claim 4, wherein said lens element is sensitive to temperature change.

6. The optical device as claimed in claim 1, wherein said temperature sensor is located between the lens element and said cylindrical surface.

7. The optical device as claimed in claim 1, further comprising:

a distance measuring device which measures a distance from the optical device to an object; and a correcting device which corrects the distance measured by said distance measuring device in accordance with the temperature sensed by said temperature sensor.

8. The optical device as claimed in claim 1, wherein said lens system is a zoom lens system.

9. An optical device for a camera, said optical device comprising:

a lens system having at least one lens element;

a lens barrel for containing the lens system therein,, said lens barrel having a cylindrical surface and a cylindrical interior volume divided into an upper quadrant region which is located between the center axis of said cylindrical interior volume and an upper quarter segment of said cylindrical surface, and the remaining lower three quadrant region, which is located between said center axis and the remaining lower three quarter segment of said cylindrical surface;

a temperature sensor which is provided inside of the lens barrel, said temperature sensor being located within said lower three quadrant region of said interior volume of said lens barrel.

10. The optical device as claimed in claim 9, wherein said correcting device corrects image point position data in accordance with the temperature sensed by said sensor.

11. The optical device as claimed in claim 9, wherein said correcting device corrects a driving amount of a focusing lens of said lens system in accordance with the temperature.

12. The optical device as claimed in claim 9, wherein said lens system includes at least one sensitive lens element which is sensitive to temperature change.

13. The optical device as claimed in claim 12, where said temperature sensor is positioned substantially in the plane of the sensitive lens element and offset from the periphery thereof.

14. The optical device as claimed in claim 9, wherein said temperature sensor is located in the periphery of the lens element.

15. The optical device as claimed in claim 14, wherein said lens element is sensitive to temperature change.

16. The optical device as claimed in claim 9, wherein said temperature sensor is located between the lens element and said cylindrical surface.

17. The optical device as claimed in claim 9, wherein said lens system is a zoom lens system.

18. A method of making an optical device comprising the step of providing a lens system which includes a lens element in a lens barrel, said lens barrel having a cylindrical surface and a cylindrical interior volume divided into an upper quadrant region, which is located between the center axis of said cylindrical interior volume and an upper quarter segment of said cylindrical surface, and a lower three quadrant region, which is located between said center axis and the remaining lower three quarter segment of said cylindrical surface; and providing a temperature sensor in the lens barrel within said lower three quadrant region offset interior volume of said lens barrel.

19. The method as claimed in claim 18, wherein said lens element is a sensitive lens which is sensitive to temperature change.

20. The method as claimed in claim 18 wherein said temperature sensor is located on the periphery of the lens element.

21. The method as claimed in claim 18 wherein said temperature sensor is located between the lens element and said cylindrical surface.

* * * * *